United States Patent
Eriksson et al.

(10) Patent No.: US 12,447,966 B2
(45) Date of Patent: Oct. 21, 2025

(54) CONTROLLING EATS TEMPERATURE

(71) Applicant: VOLVO TRUCK CORPORATION, Gothenburg (SE)

(72) Inventors: Anders Eriksson, Torslanda (SE); Erik Jonsson Holm, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/591,724

(22) Filed: Feb. 29, 2024

(65) Prior Publication Data

US 2024/0308518 A1    Sep. 19, 2024

(30) Foreign Application Priority Data

Mar. 17, 2023    (EP) .................................... 23162647

(51) Int. Cl.
*B60W 30/18*        (2012.01)
*B60W 10/06*        (2006.01)
(Continued)

(52) U.S. Cl.
CPC ...... *B60W 30/18136* (2013.01); *B60W 10/06* (2013.01); *B60W 10/10* (2013.01); *B60W 10/184* (2013.01); *B60W 10/198* (2013.01); *B60W 30/146* (2013.01); *F02D 41/126* (2013.01); *B60W 2510/068* (2013.01); *B60W 2520/10* (2013.01); *B60W 2552/15* (2020.02); *B60W 2710/0627* (2013.01);
(Continued)

(58) Field of Classification Search
CPC ......... B60W 30/18136; B60W 30/146; B60W 10/06; B60W 10/10; B60W 10/184; B60W 10/198; B60W 2510/068; B60W 2520/10; B60W 2552/15; B60W 2710/0627; B60W 2710/0644; B60W 2710/1005; B60W 2710/10; B60W 2720/10; F02D 41/126
See application file for complete search history.

(56) References Cited

U.S. PATENT DOCUMENTS 10,118,621 B2 *  11/2018  Roos ............... B60W 30/18136
2015/0233314 A1    8/2015  Stenlaas et al.
(Continued)

FOREIGN PATENT DOCUMENTS

DE    102013020658 A1    6/2015
KR    20220160734 A *  12/2022  ............ B60W 10/06
(Continued)

OTHER PUBLICATIONS

Extended European Search Report in corresponding European Application No. 23162647.4 dated Aug. 23, 2023 (7 pages).

*Primary Examiner* — Tinh Dang
(74) *Attorney, Agent, or Firm* — Venable LLP; Jeffri A. Kaminski

(57) ABSTRACT

In an aspect, a computer system is provided comprising processing circuitry configured to acquiring information indicating a temperature of an exhaust aftertreatment system, EATS, of a vehicle, maintaining a current gear of the vehicle in response to the vehicle approaching a downhill slope and the acquired information indicating that the temperature should be increased, and decreasing speed of an engine of the vehicle for causing engine braking in the downhill slope, while maintaining a speed of the vehicle within a set vehicle speed range.

16 Claims, 7 Drawing Sheets

(51) Int. Cl.
*B60W 10/10* (2012.01)
*B60W 10/184* (2012.01)
*B60W 10/198* (2012.01)
*B60W 30/14* (2006.01)
*F02D 41/12* (2006.01)

(52) U.S. Cl.
CPC ............... *B60W 2710/0644* (2013.01); *B60W 2710/1005* (2013.01); *B60W 2720/10* (2013.01)

(56) References Cited

U.S. PATENT DOCUMENTS

| | | |
|---|---|---|
| 2016/0332631 A1 | 11/2016 | Roos et al. |
| 2016/0332632 A1* | 11/2016 | Roos .................. B60W 50/0097 |
| 2019/0184996 A1 | 6/2019 | Follen et al. |
| 2022/0074363 A1 | 3/2022 | Forsberg et al. |

FOREIGN PATENT DOCUMENTS

| | | | | |
|---|---|---|---|---|
| RU | 2536753 C2 * | 12/2014 | ............ | B60W 10/06 |
| WO | 2015108473 A1 | 7/2015 | | |

* cited by examiner

CONTROLLING EATS TEMPERATURE

TECHNICAL FIELD

The disclosure relates generally to cruise control (CC) at downhill driving. In particular aspects, the disclosure relates to controlling temperature of an exhaust aftertreatment system (EATS) adaptive cruise control at downhill driving. The disclosure can be applied in heavy-duty vehicles, such as trucks, buses, and construction equipment. Although the disclosure may be described with respect to a particular vehicle, the disclosure is not restricted to any particular vehicle.

BACKGROUND

An exhaust aftertreatment system (EATS) may be implemented in modern internal combustion engine (ICE) vehicles, such as trucks, for complying with emission legislation.

With an EATS, the exhaust gases are cleaned, which has as an effect that ICE emissions are greatly reduced.

To attain cleaning of the exhaust gases in an EATS, it is important that the EATS temperature is sufficiently high.

However, to maintain a sufficiently high EATS temperature may be challenging, in particular during downhill driving.

SUMMARY

According to a first aspect of the disclosure, a computer system is provided comprising processing circuitry configured to acquiring information indicating a temperature of an exhaust aftertreatment system (EATS) of a vehicle, maintaining a current gear of the vehicle in response to the vehicle approaching a downhill slope and the acquired information indicating that the temperature should be increased, and decreasing speed of an engine of the vehicle for causing engine braking in the downhill slope, while maintaining a speed of the vehicle within a set vehicle speed range.

The first aspect of the disclosure may seek to resolve an issue of controlling EATS temperature. A technical benefit may include to increase EATS temperature during downhill driving.

In some examples, the processing circuitry is configured to control the speed of the vehicle to be at a lower speed limit of the set vehicle speed range in response to the vehicle approaching the downhill slope and the acquired information indicating that the temperature should be increased. A technical benefit may include to control the speed of the engine to be as low as possible while attaining a longest possible engine braking time period.

In some examples, the processing circuitry is configured to apply service braking for lowering the speed of the vehicle in response to the vehicle reaching an upper speed limit of the set vehicle speed range in the downhill slope due to insufficient engine braking power. A technical benefit may include to use service braking rather than engine braking at a lower gear to avoid increasing engine speed.

In some examples, the processing circuitry is configured to discontinuing fuel supply to the engine, upon decreasing speed of the engine of the vehicle for causing engine braking in the downhill slope.

In some examples, the processing circuitry is configured to increase the speed of the engine for causing the engine to discontinue engine braking in response to the vehicle reaching a lower speed limit of the set vehicle speed range in the downhill slope.

In some examples, the processing circuitry is configured to increase fuel supply to the engine upon increasing the speed of the engine for causing the engine to discontinue engine braking in response to the vehicle reaching a lower speed limit of the set vehicle speed range in the downhill slope.

In some examples, the processing circuitry is configured to perform upshifting of the current gear of the vehicle upon increasing the speed of the engine for causing the engine to discontinue engine braking in response to the vehicle reaching a lower speed limit of the set vehicle speed range in the downhill slope.

A technical benefit of either increasing fuel supply to the engine or performing upshifting of the current gear of the vehicle may include that the EATS temperature increases.

In some examples, the processing circuitry is configured to monitor the temperature of the EATS by reading a temperature sensor.

In some examples, the processing circuitry is configured to determine that the temperature of the EATS is below a lower EATS temperature threshold value and should be increased upon acquiring information indicating the temperature of the EATS of the vehicle.

In some examples, the lower EATS temperature threshold is set to 200° C.

In some examples, the processing circuitry is configured to determine that the temperature of the EATS is equal to or above the lower EATS temperature threshold value and should be decreased.

In some examples, the processing circuitry is configured to determine that the temperature of the EATS is above an upper EATS temperature threshold value and should be decreased.

In some examples, the upper EATS temperature threshold is set to 400° C.

In some examples, the processing circuitry is configured to perform a downshift of the current gear of the vehicle, in response to the vehicle approaching the downhill slope and the acquired information indicating that the temperature should be decreased, for causing engine braking in the downhill slope while maintaining a speed of the vehicle within the set vehicle speed range.

In some examples, the processing circuitry is configured to control the speed of the vehicle to be at an upper speed limit of the set vehicle speed range in response to the vehicle approaching the downhill slope and the acquired information indicating that the temperature should be decreased.

In some examples, a vehicle is provided comprising the computer system of the first aspect.

According to a second aspect of the disclosure, a computer-implemented method is provided comprising acquiring, by processing circuitry of a computer system, information indicating a temperature of an EATS of a vehicle, maintaining, by the processing circuitry, a current gear of the vehicle in response to the vehicle approaching a downhill slope and the acquired information indicating that the temperature should be increased, and decreasing, by the processing circuitry, speed of an engine of the vehicle for causing engine braking in the downhill slope, while maintaining a speed of the vehicle within a set vehicle speed range.

In some examples, the method comprises controlling, by the processing circuitry, the speed of the vehicle to be at a lower speed limit of the set vehicle speed range in response to the vehicle approaching the downhill slope and the acquired information indicating that the temperature should be increased.

In some examples, a computer program product is provided comprising program code for performing, when executed by the processing circuitry, the method of the second aspect.

In some examples, a non-transitory computer-readable storage medium comprising instructions is provided, which when executed by the processing circuitry, cause the processing circuitry to perform the method of the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Cruise Control (CC) is a common feature in vehicles today, in which speed of a vehicle such as a car or a truck is automatically controlled in accordance with a desired set speed within a given speed range, such as a set speed of 85 km/h in a speed range between 80 km/h and 90 km/h.

Figure 1:
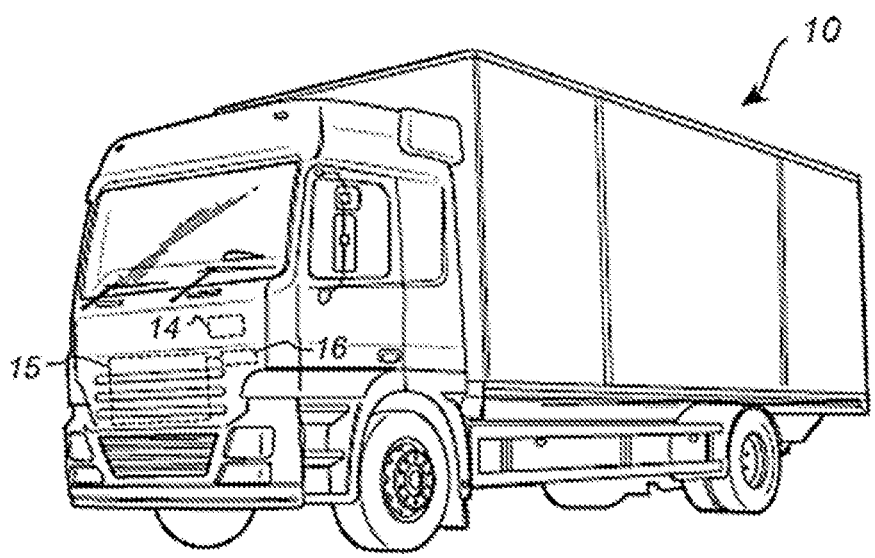
FIG. 1 illustrates a vehicle in the form of a truck in which examples of the present disclosure may be implemented.

FIG. 1 illustrates a vehicle in the form of a truck 10 in which examples of the present disclosure may be implemented, the truck 10 being equipped with a computer system 14 e.g. in the form of a so-called Electronic Control Unit (ECU) controlling operation of the truck 10. For implementing CC, the ECU 14 is typically in communicative connection with one or more speed sensors of the truck 10 for monitoring a current speed of the vehicle.

The truck 10 is equipped with an internal combustion engine (ICE) 15 downstream of which an exhaust aftertreatment system (EATS) 16 is implemented which cleans exhaust gases of the engine 15.

It is important that the temperature of the EATS 16 is sufficiently high for effective cleaning of the exhaust gases to be performed. However, the EATS temperature is dependent on numerous parameters, one parameter being torque and speed of the engine 15.

Figure 2:
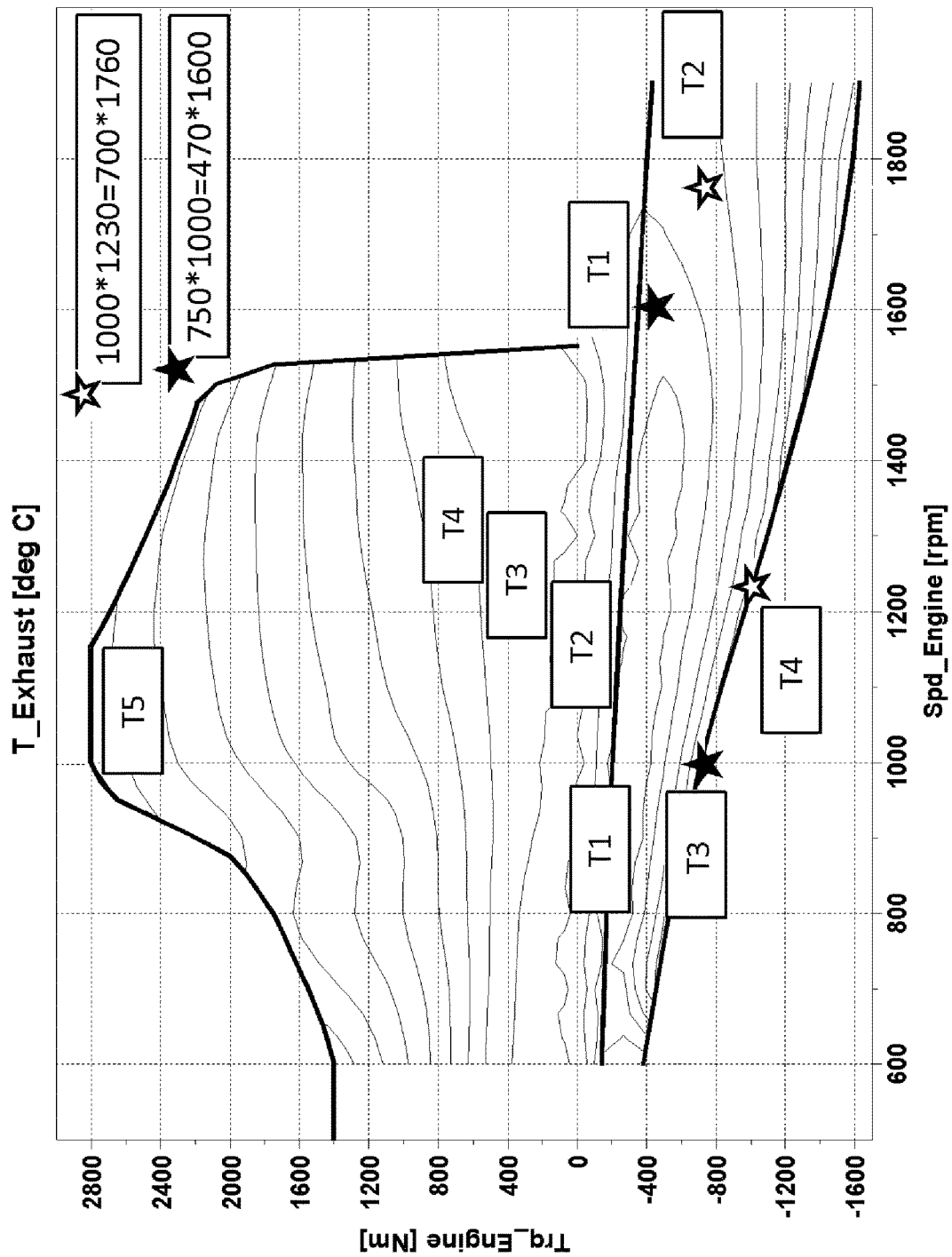
FIG. 2 shows a graph illustrating EATS temperature as a function of torque applied to an engine of the truck of FIG. 1 and engine speed.

FIG. 2 shows a graph illustrating exhaust temperature as a function of the torque applied to the engine 15 and engine speed represented by revolutions per minute (rpm). A negative torque indicates engine braking while a positive torque indicates the CC opening a throttle of the engine to inject fuel in order to increase engine power and thus potentially increasing the speed of the truck 10. As is understood, an increase in exhaust temperature will increase EATS temperature, while a decrease in exhaust temperature accordingly will decrease the EATS temperature. As is understood, substantial heating/cooling of exhaust temperature and—correspondingly—EATS temperature does not occur momentarily; there is a certain thermal inertia in the system. In the following, the temperature referred to with reference to FIG. 2 will be the EATS temperature.

As illustrated in FIG. 2 with filled stars, an engine speed of 1600 rpm at a torque of −470 Nm causes the same braking power of the truck 10 as an engine speed of 1000 rpm at a torque of −750 Nm, i.e. (−470×1600)=(−750×1000). The braking power (kW) is computed as torque (Nm)×speed (RPM)/9.5488, which in this example thus would amount to just under 80 kW.

However, while the EATS temperature is at T1 in the former example, the temperature increases to T3 in the latter. Exhaust temperature is indicated with contour lines in FIG. 2, where T1 indicates a lowest temperature while T5 indicates a highest temperature. As is understood, temperature T5 may be triple that of lower temperature T1.

Similarly, as indicated with unfilled stars, an engine speed of 1760 rpm at a torque of −700 Nm causes the same braking power of the truck 10 as an engine speed of 1230 rpm at a torque of −1000 Nm, i.e. (−700×1760)=−1000×1230), while the EATS temperature increases from T2 to T4.

In other words, as illustrated in FIG. 2, the same engine braking power can be achieved by using different combinations of engine speed and applied torque, which results in different EATS temperatures. Different combinations of engine speed and applied torque can be achieved by selecting different transmission gears.

While equipment such as heaters may be used to increase the EATS temperature in case the temperature is not sufficiently high, such heaters are undesirable since truck fuel is consumed for causing the heating.

Thus, the ECU 14 may indirectly control EATS temperature by controlling the speed of the engine 15 and the torque applied, i.e. the degree of engine braking being applied at different engine speeds.

Although the vehicle 10 in FIG. 1 is depicted as a heavy-duty truck, examples of the present disclosure may be implemented in other types of ICE vehicles, such as in passenger cars, busses, light-weight trucks, mid-weight trucks, construction equipment, motorcycles, marine vessels, etc.

Figure 3:
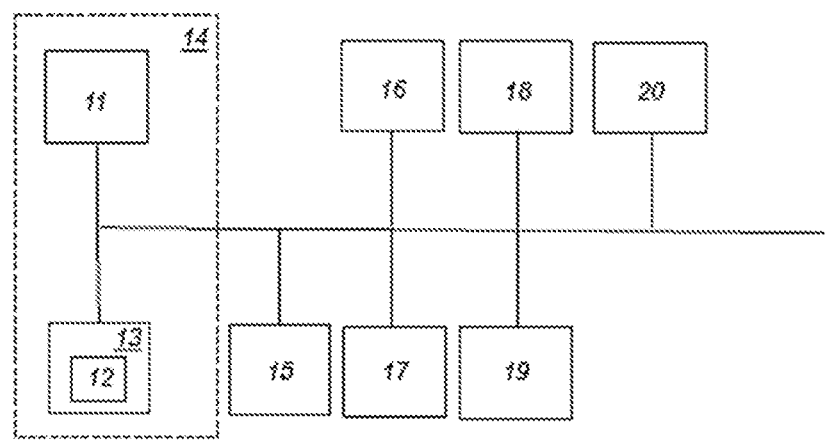
FIG. 3 shows an exemplary system diagram of a computer system with which the truck of FIG. 1 is equipped according to the present disclosure.

FIG. 3 shows an exemplary system diagram of the computer system 14 with which the truck 10 of FIG. 1 is equipped according to the present disclosure. The computer system 14 will in the following be exemplified by an ECU.

The ECU 14 generally comprises a processing unit 11 embodied in the form of one or more microprocessors arranged to execute a computer program 12 downloaded to a storage medium 13 associated with the microprocessor, such as a Random Access Memory (RAM), a Flash memory or a hard disk drive. The processing unit 11 is arranged to cause the ECU 14 to perform desired operations when the appropriate computer program 12 comprising computer-executable instructions is downloaded to the storage medium 13 and executed by the processing unit 11. The storage medium 13 may also be a computer program product comprising the computer program 12. Alternatively, the computer program 12 may be transferred to the storage medium 13 by means of a suitable computer program product, such as a Digital Versatile Disc (DVD) or a memory stick. As a further alternative, the computer program 12 may be downloaded to the storage medium 13 over a network. The processing unit 11 may alternatively be embodied in the form of a digital signal processor (DSP), an application specific integrated circuit (ASIC), a field-programmable gate array (FPGA), a complex programmable logic device (CPLD), etc. The processing device 11 will in the following be referred to as a central processing unit (CPU).

Further shown in FIG. 3 is the engine 15 and the EATS 16. As is understood, a temperature sensor 17 will typically be utilized for monitoring the temperature of the EATS 16

The ECU 14 according to examples of the present disclosure may further be in communication with other subsystems for performing CC, such as for instance an engine control module (ECM) 18 for controlling speed and acceleration/deceleration of the truck 10, a transmission control module (TCM) 19 changing gears, brake control module (BCM) 20 for controlling braking, etc. Communication between the various components illustrated in FIG. 3 may occur via e.g. a Controller Area Network (CAN), a Local Interconnect Network (LIN), Ethernet, etc.

Figure 4:
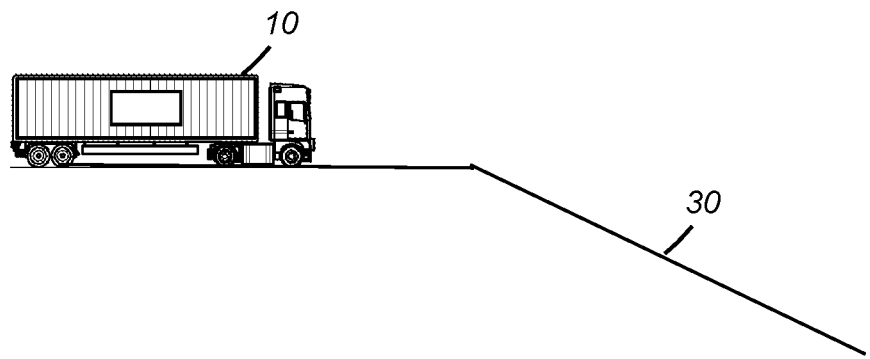
FIG. 4 illustrates an example of the disclosure where a truck approaches a downhill slope.

FIG. 4 illustrates an example of the disclosure where the truck 10 approaches a downhill slope 30. Assuming that the ECU 14 monitors the EATS temperature as provided by the temperature sensor 17 and concludes that the temperature is not sufficiently high, such as below an EATS temperature threshold value of, say, 200° C.

As is understood, a decrease in EATS temperature is typically not a problem as long as the truck 10 travels on a level or uphill road since, as illustrated in FIG. 2, the ECU 14 providing the CC is required to apply a positive torque and thus inject fuel to the engine to increase the speed of the truck 10 to comply with a set CC speed range, e.g. 80-90 km/h.

As shown in FIG. 2, the EATS temperature quickly increases with increasing engine torque. In other words, using a manual analogy, the ECU 14 "step on the gas" when the truck 10 travels on a level road or uphill to avoid the speed of the truck 10 falling below 80 km/h, which quickly increases the EATS temperature.

Figure 5:
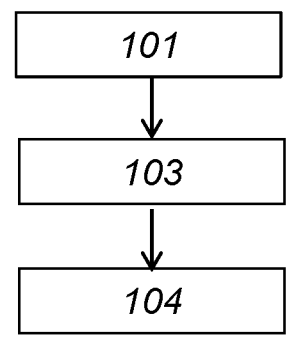
FIG. 5 shows a flowchart illustrating an example method according to the present disclosure.

However, with reference again to FIG. 4 and further to FIG. 5 showing a flowchart illustrating an example method, the CPU 11 of the ECU 14 acquires information in 101 indicating that the EATS temperature should be increased. As. Is understood, this information may be acquired well before the downhill slope 30 is actually approached In 103, the CPU 11 of the ECU 14 maintains a current gear of the truck 10 in response to the truck 10 approaching the downhill slope and decreases, in 104, engine speed of the truck 10 for causing engine braking, while maintaining a speed of the truck 10 within the set CC speed range of 80-90 km/h.

In an example, the CPU 11 of the ECU 14 throttles the fuel supplied to the engine 15 causing the engine speed to decrease. Thus, any supply of fuel to the engine 15 is discontinued by the ECU 14. In other words, using a manual analogy, the ECU 14 "takes its foot of the gas", which causes engine braking.

In line with the previous example given with reference to FIG. 2 (indicated by means of the stars), assuming that an engine braking power of around 80 kW is required to be applied by the ECU 14 in order to avoid the speed of the truck 10 increasing above the upper CC speed limit of 90 km/h, rather than operating the engine 15 at an rpm of 1600 to apply a braking torque of 470 Nm resulting in an EATS temperature of T1, the CPU 11 of the ECU 14 will decrease the engine speed in 103 down to about 750 rpm to apply a braking torque of 1000 Nm, which has as an advantage that the EATS temperature (eventually) may increase to T3 (i.e. above the exemplifying EATS temperature threshold of 200° C.).

Further advantageous is that by maintaining the current gear upon approaching the downhill slope 30, rather than applying the typical approach of downhill driving where a gear downshift is performed, an increase in engine rpm— and thus a decrease in EATS temperature—is avoided.

As is understood, if there is no indication that the EATS temperature should be increased, or even that the EATS temperature is too high when the truck 10 approaches the downhill slope 30, the common approach of performing a gear downshift may be applied, which hence has the effect of increasing the rpm of the engine 15 to cause the same engine braking power and accordingly decreasing the EATS temperature.

Figure 6:
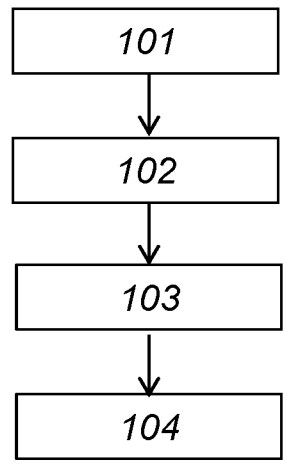
FIG. 6 shows a flowchart illustrating another example method according to the present disclosure.

FIG. 6 shows a flowchart illustrating a further example method. In this example, the CPU 11 of the ECU 14 again acquires information in 101 indicating that the EATS temperature should be increased.

In response to the truck 10 approaching the downhill slope 30, the CPU 11 controls the speed of the truck 10 in 102 to be at the lower speed limit of 80 km/h of the set CC speed range of 80-90 km/h.

Again, in 103, the CPU 11 of the ECU 14 maintains a current gear of the truck 10 and decreases the engine speed of the truck 10 for causing engine braking by discontinuing the supply of fuel to the engine 15 in 104, while maintaining the speed of the truck 10 within the set CC speed range of 80-90 km/h.

Advantageously, the CPU 11 thus controls the rpm of the engine 15 to be as low as possible while attaining a longest possible engine braking time period.

Thus, in case the downhill slope 30 is steep, which causes the speed of the truck 10 to slowly increase due to insufficient braking power, the engine braking time period is maximized since the speed of the truck 10 is controlled by the ECU 14 to be at the lower speed limit of 80 km/h of the set CC speed range in response to the truck 10 approaching the downhill slope 30 and the engine braking starts.

In contrast, a common approach is to control the speed of the truck 10 to be at the upper speed limit of 90 km/h of the set CC speed range in response to the truck 10 approaching the downhill slope 30 and then perform a gear downshift to cause engine braking. This would generally result in a higher average speed for the CC. However, this would also result in a higher rpm and lower torque of the engine 15, which implies a lower EATS temperature.

Assuming that the CPU 11 controls the speed of the truck 10 in 102 to be at—or at least just above—the lower speed limit of 80 km/h of the set CC speed range of 80-90 km/h in response to the truck 10 approaching the downhill slope 30, maintains a current gear of the truck 10 in 102 and decreases the engine speed of the truck 10 for causing engine braking by discontinuing the supply of fuel to the engine 15 in 103.

Figure 7:
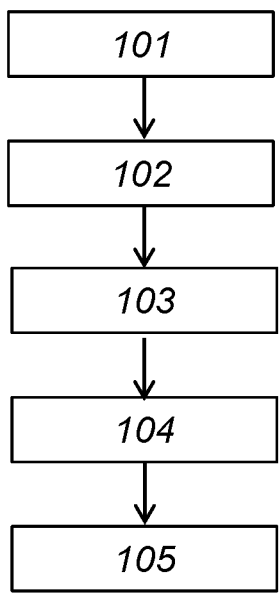
FIG. 7 shows a flowchart illustrating a further example method according to the present disclosure.

FIG. 7 shows a flowchart of an example method, wherein if the braking power is not sufficient for maintaining the speed of the truck 10 below the upper speed limit of 90 km/h (which may be strictly necessary for legislative reasons), the CPU 11 of the ECU 14 will in an example lower the truck speed by performing service braking in 105.

This has the advantage that the rpm of the engine 15 will decrease and the EATS temperature will thus increase (as described in detail hereinabove with reference to FIG. 2).

A further advantage is that no gear downshift is performed, which would have been the case if engine braking alternatively would have been applied instead of service braking, which not only avoids a decrease in the EATS temperature but is favorable both from a comfort aspect and from a safety aspect since missing a gear downshift in a steep downhill can cause the truck 10 to unintentionally increase the speed.

Figure 8:
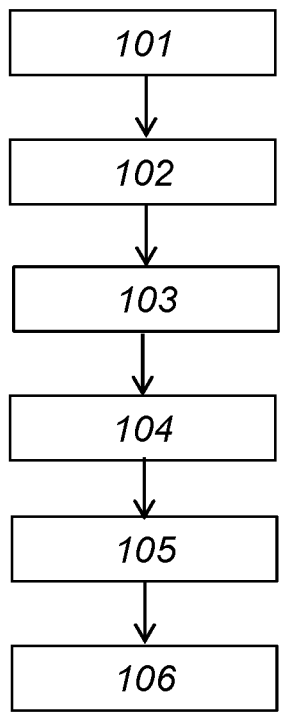
FIG. 8 shows a flowchart illustrating another example method according to the present disclosure.

FIG. 8 shows a flowchart of another example method, wherein if the downhill slope 30 is not steep enough having as an effect that the speed of the truck 10 decreases below the lower speed limit of 80 km/h, the CPU 11 of the ECU 14 may increase the engine speed in 106.

In an example, this may be performed by the CPU 11 by increasing the supply of fuel to the engine 15 to speed up the truck 10. Again with reference to FIG. 2, this will result in a positive engine torque and the EATS temperature will heat up.

Alternatively, the CPU 11 may perform a gear upshift, which decreases both the applied braking power and the rpm of the engine 15, which advantageously causes an increase in EATS temperature.

In case the truck 10 is equipped with a more sophisticated CC, such as a so-called predictive CC with the ability to predict upcoming downhill slopes from e.g. map data, any planning as regards EATS temperature and the resulting control of speed and gear as described in the above examples may be performed long in advance to perform a proper braking strategy.

If driving e.g. in warmer weather conditions where the EATS temperature should be deceased rather than increased, the CPU 11 may select a lower gear than really needed in order to decrease the EATS temperature.

Figure 9:
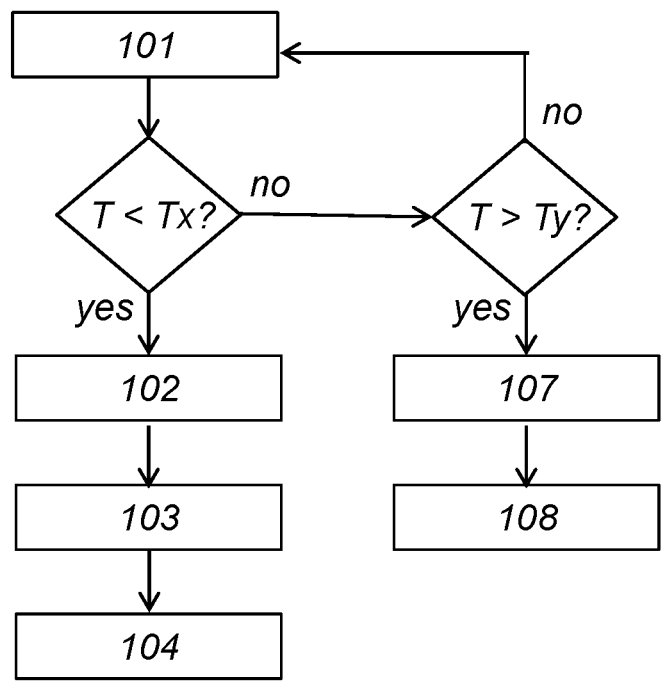
FIG. 9 shows a flowchart illustrating another example method according to the present disclosure.

FIG. 9 shows a flowchart of another example method.

In 101, the CPU 11 of the ECU 14 acquires information indicating the EATS temperature T, for instance by monitoring the temperature sensor 17. In this particular example, if the EATS temperature T is below a predetermined lower temperature threshold value Tx, say 200° C., the EATS temperature should be increased.

In response to the truck 10 approaching the downhill slope 30, the CPU 11 may control the speed of the truck 10 in 102 to be at the lower speed limit of 80 km/h of the set CC speed range of 80-90 km/h.

In 103, the CPU 11 of the ECU 14 maintains a current gear of the truck 10 and decreases the engine speed of the truck 10 for causing engine braking by discontinuing (or at least decreasing) the supply of fuel to the engine 15 in 104, while maintaining the speed of the truck 10 within the set CC speed range of 80-90 km/h.

Advantageously, the CPU 11 thus controls the rpm of the engine 15 to be as low as possible while attaining a longest possible engine braking time period for increasing the EATS temperature T to Tx.

If the information acquired in 101 indicates that the EATS temperature T should be decreased, e.g. if the EATS temperature T is above a predetermined upper temperature threshold value Ty, say 400° C., the CPU 11 may in 107 control the speed of the truck 10 to be at the upper speed limit of 90 km/h of the set vehicle speed range in response to the truck 10 approaching the downhill slope 30.

Then, the CPU 11 performs a gear downshift in 108 to cause engine braking, again while maintaining a speed of the truck 10 within the set vehicle speed range of 80-90 km/h, which results in a higher rpm and lower torque of the engine 15 and thereby a lower EATS temperature T.

As is understood, in this case, while the rpm of the engine 15 typically is lowered, it is not necessarily lowered as much as in 104 (unless required for not exceeding the upper speed limit). Thus, in 108, the CPU 11 does not necessarily discontinue the fuel supply to the engine 15.

Further, a gear downshift to increase engine braking power may be envisaged, since the EATS temperature T then further will decrease.

While in FIG. 9 it is illustrated that the CPU 11 determines that the EATS temperature T should be decreased in case T>Ty, it may be envisaged that the CPU determines that the EATS temperature should be decreased already when the EATS temperature T is equal to or above 200° C., i.e. T≥ Tx, wherein the CPU 11 proceeds with performing 107 and 108 without determining whether or not T>Ty.

Figure 10:
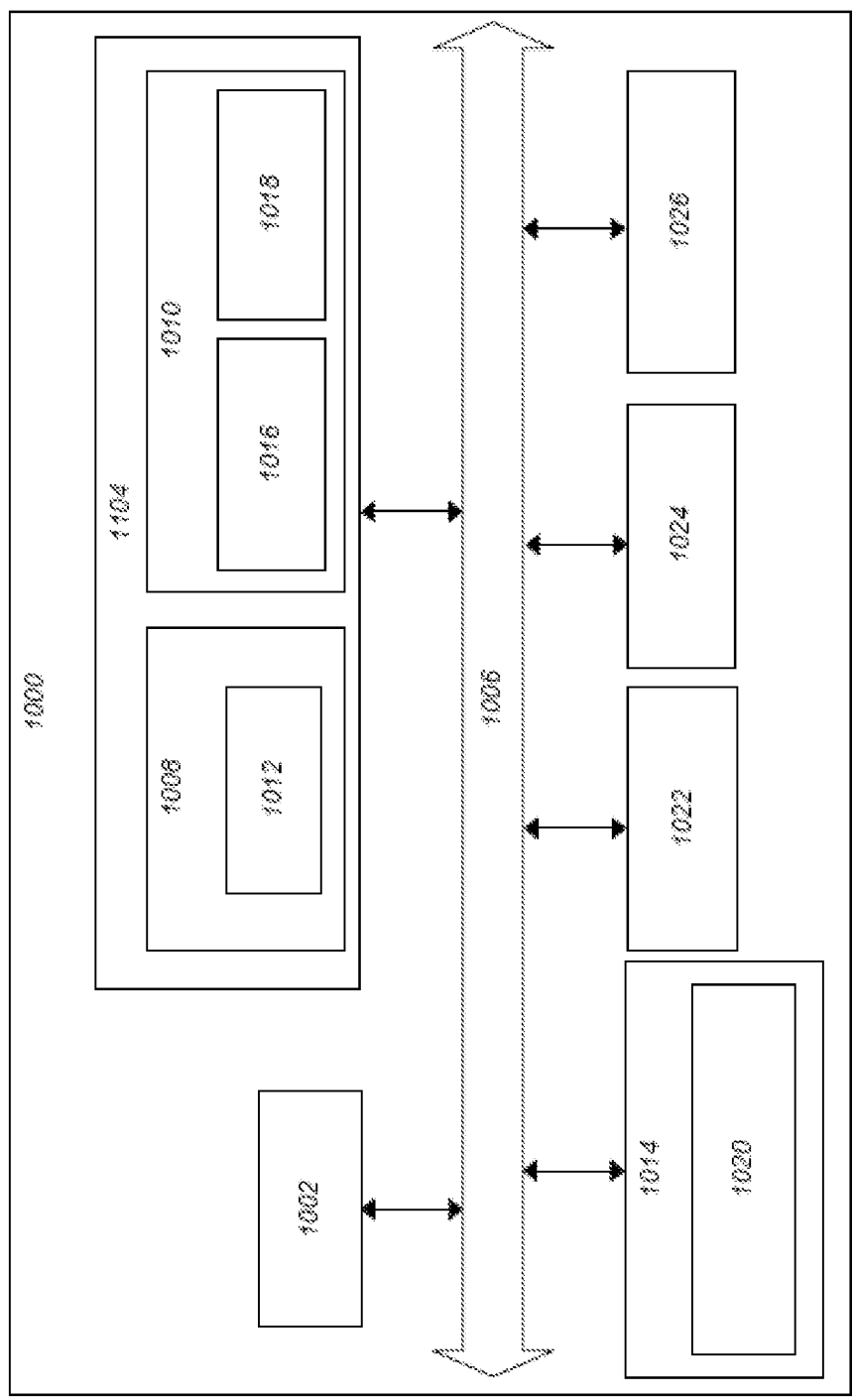
FIG. 10 is a schematic diagram of a computer system for implementing examples disclosed herein.

FIG. 10 is a schematic diagram of a computer system 1000 for implementing examples disclosed herein. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or signal processing or for executing computer code stored in memory 1004. The processing circuitry 1002 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:
   acquiring information indicating a temperature of an exhaust aftertreatment system, EATS, of a vehicle;
   acquiring a set cruise control speed;
   determining a lower speed limit of a vehicle speed range based on the cruise control speed;
   determining an upper limit of the vehicle speed range based on the cruise control speed;
   setting a speed range of the vehicle to the upper speed limit of the vehicle speed range and the lower speed limit of the vehicle speed range;
   controlling the speed of the vehicle to be at the lower speed limit of the vehicle speed range in response to the vehicle approaching the downhill slope and the acquired information indicating that the temperature should be increased;
   maintaining a current gear of the vehicle in response to the vehicle approaching a downhill slope and the acquired information indicating that the temperature should be increased; and
   decreasing speed of an engine of the vehicle by discontinuing fuel supply to the engine for causing engine braking in the downhill slope, while maintaining a speed of the vehicle within a set vehicle speed range.

2. The computer system of claim 1, the processing circuitry further being configured to:
   applying service braking for lowering the speed of the vehicle in response to the vehicle reaching an upper speed limit of the set vehicle speed range in the downhill slope due to insufficient engine braking power.

3. The computer system of claim 1, the processing circuitry further being configured to:
   increasing the speed of the engine for causing the engine by increasing fuel supply to the engine to discontinue engine braking in response to the vehicle reaching a lower speed limit of the set vehicle speed range in the downhill slope.

4. The computer system of claim 3, the processing circuitry further being configured to, upon increasing the speed of the engine for causing the engine to discontinue engine braking in response to the vehicle reaching a lower speed limit of the set vehicle speed range in the downhill slope:
   performing upshifting of the current gear of the vehicle.

5. The computer system of claim 1, the processing circuitry being configured to, upon acquiring information indicating that the temperature of the EATS of the vehicle:
   monitoring the temperature of the EATS by reading a temperature sensor.

6. The computer system of claim 1, the processing circuitry being configured to, upon acquiring information indicating the temperature of the EATS of the vehicle:
   determining that the temperature of the EATS is below a lower EATS temperature threshold value and should be increased.

7. The computer system of claim 6, the lower EATS temperature threshold being set to 200° C.

8. The computer system of claim 6, the processing circuitry being configured to, upon acquiring information indicating the temperature of the EATS of the vehicle:
   determining that the temperature of the EATS is equal to or above the lower EATS temperature threshold value and should be decreased.

9. The computer system of claim 8, the processing circuitry being configured to, upon acquiring information indicating that the temperature of the EATS of the vehicle:
   determining that the temperature of the EATS is above an upper EATS temperature threshold value and should be decreased.

10. The computer system of claim 9, the upper EATS temperature threshold being set to 400° C.

11. The computer system of claim 1, the processing circuitry being configured to:
    performing a downshift of the current gear of the vehicle, in response to the vehicle approaching the downhill slope and the acquired information indicating that the temperature should be decreased, for causing engine braking in the downhill slope while maintaining a speed of the vehicle within the set vehicle speed range.

12. The computer system of claim 11, the processing circuitry further being configured to:
    controlling the speed of the vehicle to be at an upper speed limit of the set vehicle speed range in response to the vehicle approaching the downhill slope and the acquired information indicating that the temperature should be decreased.

13. A vehicle comprising the computer system of claim 1.

14. A computer-implemented method, comprising:
    acquiring, by processing circuitry of a computer system, information indicating a temperature of an exhaust aftertreatment system, EATS, of a vehicle;
    acquiring a set cruise control speed;
    determining a lower speed limit of a vehicle speed range based on the cruise control speed;
    determining an upper limit of the vehicle speed range based on the cruise control speed;
    setting a speed range of the vehicle to the upper speed limit of the vehicle speed range and the lower speed limit of the vehicle speed range;

controlling the speed of the vehicle to be at the lower speed limit of the vehicle speed range in response to the vehicle approaching the downhill slope and the acquired information indicating that the temperature should be increased;

maintaining, by the processing circuitry, a current gear of the vehicle in response to the vehicle approaching a downhill slope and the acquired information indicating that the temperature should be increased; and decreasing, by the processing circuitry, speed of an engine of the vehicle by discontinuing fuel supply to the engine for causing engine braking in the downhill slope, while maintaining a speed of the vehicle within a set vehicle speed range.

15. The method of claim 14, further comprising:

controlling, by the processing circuitry, the speed of the vehicle to be at a lower speed limit of the set vehicle speed range in response to the vehicle approaching the downhill slope and the acquired information indicating that the temperature should be increased.

16. A non-transitory computer-readable storage medium comprising instructions, which when executed by the processing circuitry, cause the processing circuitry to perform the method of claim 14.

\* \* \* \* \*